INVENTORS
STANLEY A. FIERSTON
and FREDERICK A. REYNOLDS
BY Spencer E. Olson
ATTORNEY SYSTEM FOR INTERCONNECTING A PAIR OF SEPARATED TRANSMITTER-RECEIVERS WITH A COMMON TRANSMITTER-RECEIVER STATION Filed Nov. 26, 1963

INVENTORS.
STANLEY A. FIERSTON
and FREDERICK A. REYNOLDS
BY Spencer E. Olson
ATTORNEY.

INVENTORS.
STANLEY A. FIERSTON
and FREDERICK A. REYNOLDS
BY Spencer E. Olson
ATTORNEY.

INVENTORS.
STANLEY A. FIERSTON
and FREDERICK A. REYNOLDS

BY Spencer E. Olson
ATTORNEY.

3,325,600

SYSTEM FOR INTERCONNECTING A PAIR OF SEPARATED TRANSMITTER-RECEIVERS WITH A COMMON TRANSMITTER-RECEIVER STATION

Stanley A. Fierston, Swampscott, and Frederick A. Reynolds, Needham, Mass., assignors to Sylvania Electric Products Inc., a corporation of Delaware Filed Nov. 26, 1963, Ser. No. 325,984
5 Claims. (Cl. 179—15)

This invention relates to communication systems and more particularly to a cable system for interconnecting a pair of geographically separated transmitter-receivers with a common transmitter-receiver station.

In many applications, in the interest of increased reliability, information is transmitted from two remote locations, over separate communication links, to a central receiver. An example of such a system is shown in FIG. 1 and includes a common transmitter-receiver 12, a first geographically remote transmitter - receiver 14, which is separated geographically from a second remote transmitter-receiver 16. Each of the remote transmitter-receiver sets 14 and 16 includes a transmitter 18, a receiver 20 and a frequency division multiplexing unit 22. The common transmitter-receiver has two sets of the same equipment. The communications between remote stations 14 and 16 and the common transmitter-receiver 12 are handled by two, two-cable pairs with repeaters 24 used periodically along their length. The second remote station 16 generates and receives the same information as the first remote station 14 and provides a margin of reliability in case of failure of the first station. The price of this added reliability is high, however, being represented by the cost of two separate cables and repeaters over an essentially common path between the three stations and the duplication of equipment at station 12. Inasmuch as each communication link between a remote station and the common station can be designed to use only a portion of the available signal band to transmit its information, thereby permitting the transmission of both to be carried on a single cable link, a great saving in equipment cost could be realized by joining the portions of the two communication links which are in the same geographical direction and location.

Systems of this kind correct frequency errors by generating a pilot signal representative of the frequencies over which information is carried The pilot signal is usually chosen so that its error represents the error accumulated at the information-carrying frequencies due to attenuation by the cable links and attempted correction of this attenuation by frogging or repeater stations along the cable length. Therefore, if the previously mentioned approach of combining a certain portion of the cable links were used, it would suffer the disadvantage that the information from the first remote station 14 would probably be subjected to different frequency errors than that of the second remote station 16 due to the varying number of repeaters 24 used between the remote station and the joining point of the links and the varying cable length necessary, when the remote stations are separated from the joining point by different distances. If the two sets of information-carrying frequencies are in error by a different amount at the joining point, and therefore the respective pilot signals have a different frequency error, combining the two signals would distort the common signal transmitted to station 12; this would not affect voice signals to a great extent, but would render digital data unintelligible.

One method of correcting the different remotely transmitted signal frequency errors is to employ a frequency corrector in each remote transmission line just before the lines are joined for transmission to station 12. However, this reduces the advantage gained by joining the transmission links for a certain portion, since two frequency detector-correctors would be an addition of equipment and the object of joining the links is to reduce the amount of equipment.

A possible solution to the problem of different frequency errors would be alleviated by providing precise frogging oscillators at the repeater stations 24 so that no error is accumulated in either transmission from the remote stations 14 and 16. This approach is undesirable also, since it is unfeasible to employ precise frogging oscillators at points which are separated geographically from any of the stations 12, 14 or 16, because of power requirements and unpredictable environment.

Accordingly, a primary object of the present invention is to reduce the amount of equipment required for a system such as that shown in FIG. 1, while maintaining the same level of performance.

Briefly, this object is accomplished by combining the links for a portion of their length, and using only one set of repeaters in the resulting link, thereby reducing the amount of cable and number of repeaters. However, this approach causes problems of the kind previously described.

Therefore, another object is to provide means for equalizing the frequency errors of the information signals transmitted from the remote stations, so that the common link transmits a band of frequencies which require a single error detector and corrector at the common receiving station.

A further object is to eliminate the need for precision repeater oscillators at locations remote from any of the transmitter-receiver sets.

These and other objects are accomplished in one embodiment of the invention by combining two remote transmitter-receiver communication links into a common link for a portion of the distance between the common station and the remote stations. A circuit for combining the signals from the remote stations is provided at the point they are joined, which uses the frequency error from one remote station as a reference and applies that error to the frequencies transmitted from the other remote station after cancellation of the error from the other station. Also, a common frogging oscillator is provided at the combiner, so that its error is applied to both incoming signals, thereby alleviating the need for precision frogging oscillators in the links from the remote stations to the junction.

Other objects, features and advantages of the invention will be apparent from the following description and reference to the accompanying drawings wherein.

Figure 1:
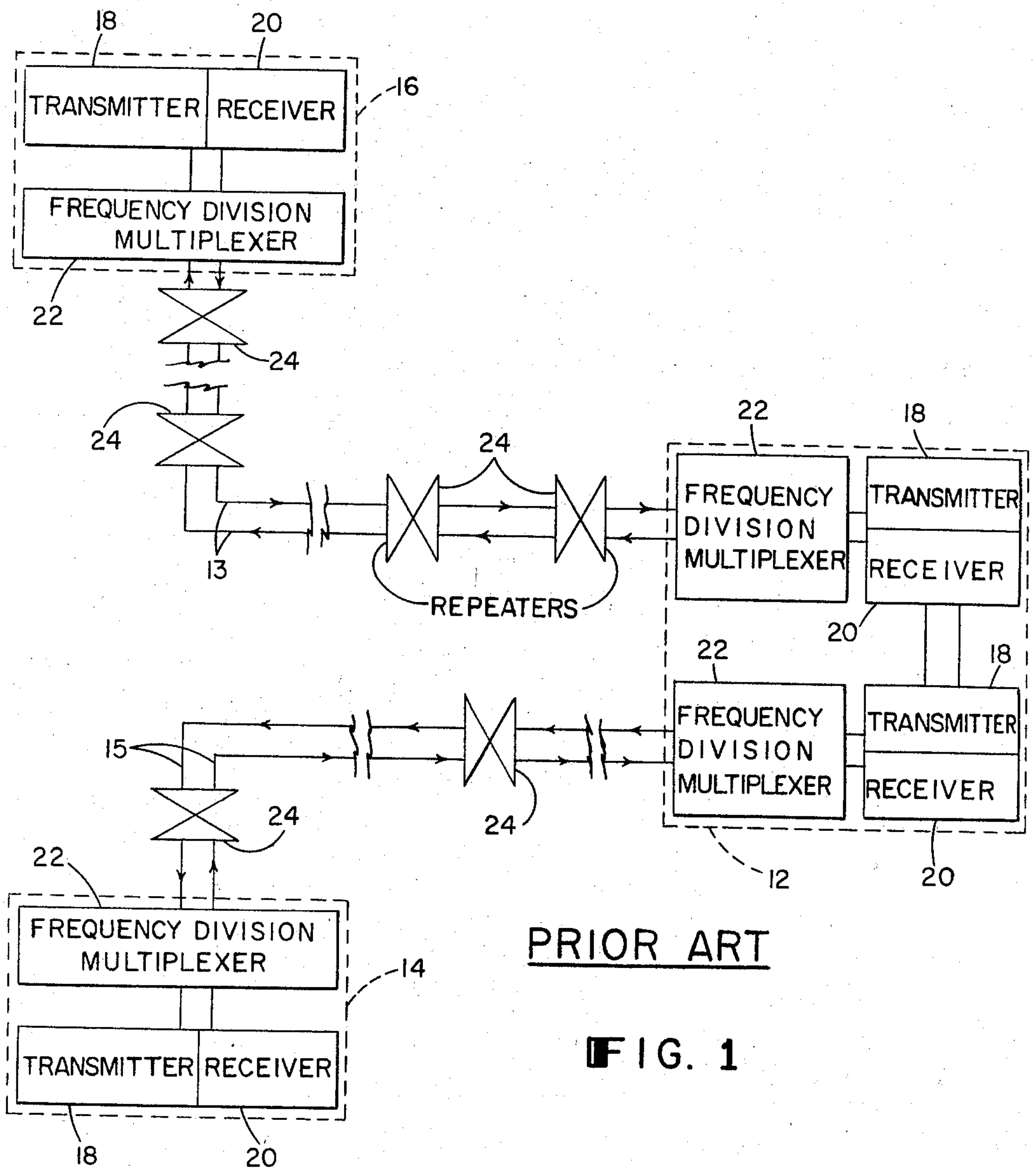
FIG. 1 is a schematic representation of a prior art communication system of the general type to which the present invention is addressed.

Referring to FIG. 1, a communications system, previously described, is shown as comprising a common or central station 12 having a pair of transmitter-receiver sets 18, 20 and a pair of frequency division multiplexing units 22 for communication respectively with a pair of remotely located stations 14 and 16, each containing one transmitter-receiver and one frequency division multiplexer. The remote stations 14 and 16 are geographically distant from the central station 12 and may be at greatly different distances from the common station. Each of the communication links 13 and 15 contains a number of repeater stations 24, the number depending upon the length of the respective links, so that each link may have a different number of repeater stations. Since the signals, when transmitted over a cable for great distances (in the order of miles) are attenuated, repeaters must be inserted in the link at predetermined points (say, every mile), to amplify the signals back to a useful amplitude. As is well known, the higher frequency signals are attenuated more than lower frequency signals, this effect being counteracted by "frogging" oscillators at the repeater stations. The function of the "frogging" oscillator is to reverse the frequency versus amplitude characteristic of the signal band, so that high frequencies are converted to low frequencies and low frequencies are converted to high frequencies. A more complete description of the frogging and amplifying functions provided at the repeater stations will be presented herein below.

Figure 2:
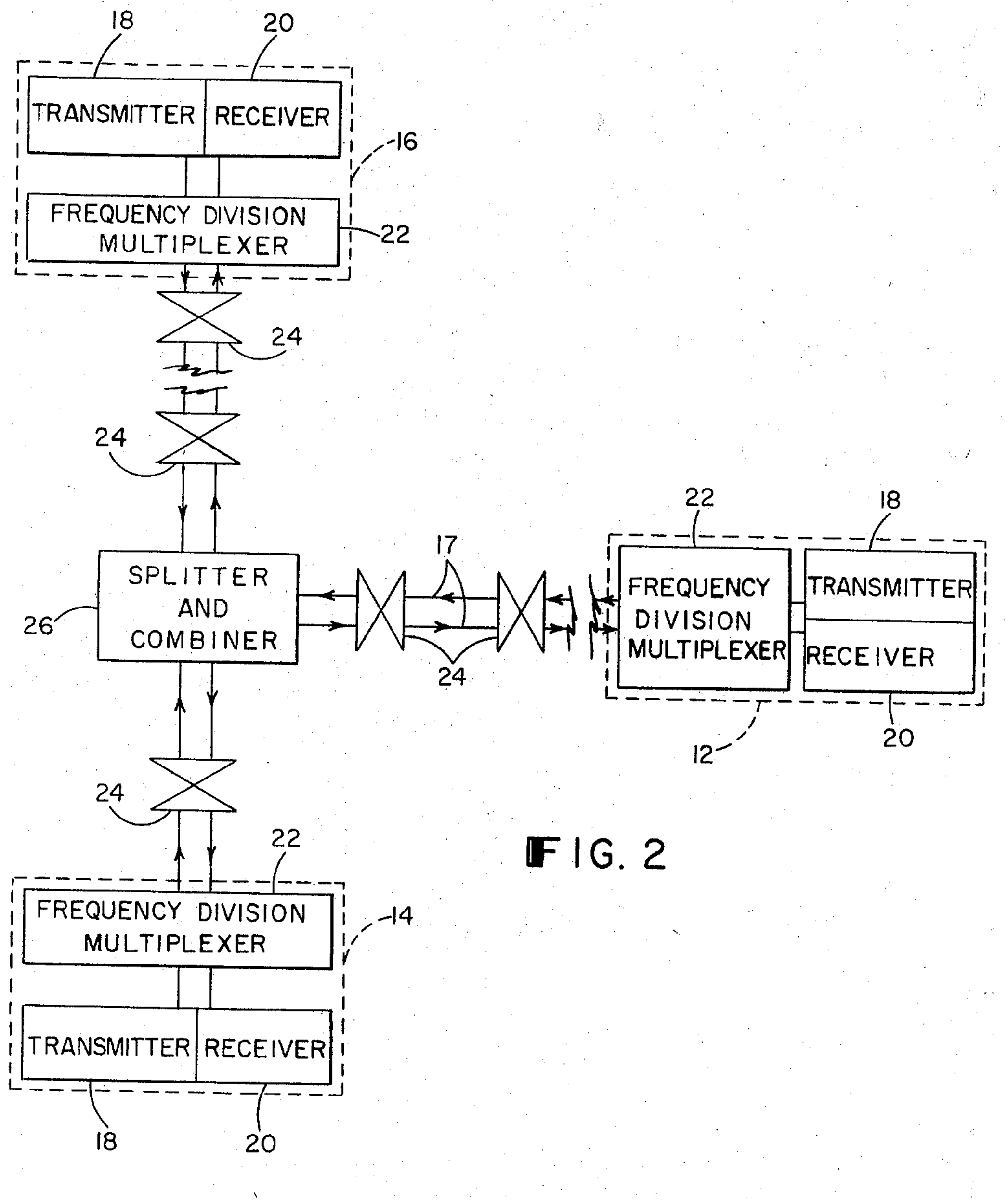
FIG. 2 is a schematic representation of a communications system according to the present invention.

Referring now to FIG. 2, a communication system of the type described in FIG. 1 is shown in which the two two-cable pair communication links 13 and 15 of the system of FIG. 1 are joined over a portion of their lengths to form a single two-cable pair communication link 17. The central station 12 differs from that of FIG. 1 in that only one transmitter 18, one receiver 20, and one frequency division multiplexing unit 22 are now required. Splitter and combiner unit 26 is provided at the junction of the link 17 with the respective communication links from and to the remote stations 14 and 16. The remote station 16 is depicted as being at a greater distance from the junction point than the remote station 14, thereby requiring more repeater stations 24 in its link with the splitter and combiner 26 than does the link with remote station 14.

However, if the splitter and combiner 26 of FIG. 2 were to use standard power splitting and power combining techniques well known in the art, the varying numbers of repeater stations in the joined links would cause a varying amount of correction for the attenuation caused by the length of the links when information is transmitted from the respective remote stations 14 and 16. This presents the further complication that the combination of two signals of different frequencies and having different frequency errors would cause difficulty in transferring the combined signals from the splitter and combiner 26 to the central station 12.

Figure 3A:
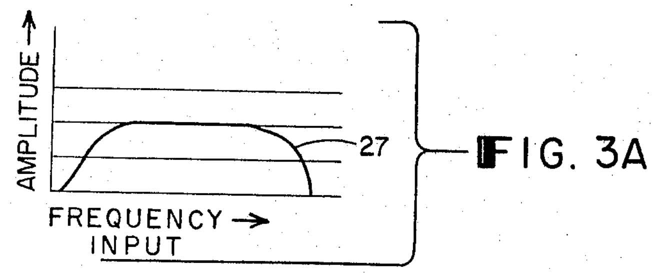
FIGS. 3A–3E are graphical representations of the concept of "frogging;"
Figure 3B:
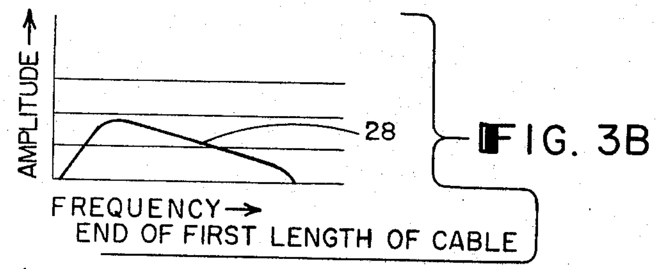
Figure 3C:
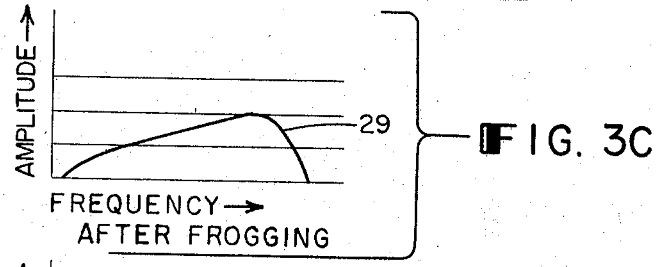
Figure 3D:
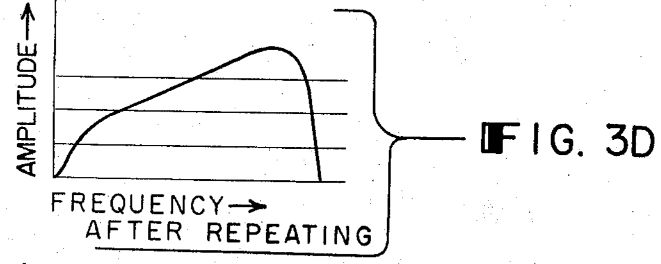
Figure 3E:
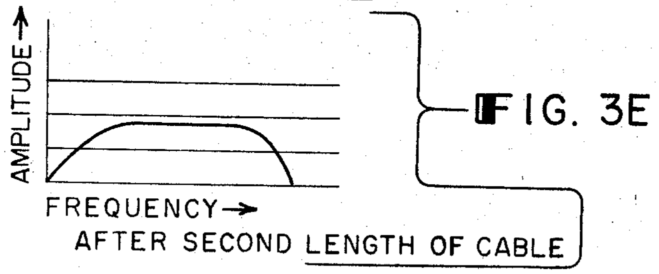

It will contribute to an understanding of the present invention to here discuss the technique of "frogging" referred to above. FIGS. 3A–3E are a series of frequency versus amplitude curves which illustrate this concept. In FIGS. 3A and 3B, lines 27 and 28, respectively, represent the frequency versus amplitude curve for a signal at its point of generation and a signal that has travelled along a finite length of cable, curve 28 showing that the attenuation is least at the lower frequencies and increases as the frequency increases. To counteract the non-uniform attenuation, a "frogging signal" at a predetermined frequency is combined with the information signal to reverse curve 28 to appear as shown by curve 29 in FIG. 3C. For instance, if the frequency band depicted in FIG. 3A extends from 30 to 30,000 cycles, and after transmission along a length of cable is "frogged" by a frequency of 30,030, the resultant frequencies at the signal band limits will be 30,000 and 30 cycles. In other words, the signal band frequencies are subtracted from the frogging signal, so that the upper side band frequency becomes the lower side band frequency and vice-versa. The repeater station also includes an amplifier to amplify the frogged frequency versus amplitude representation (shown in FIG. 3D). The next length of cable will attenuate the signal to return the frequency amplitude characteristic to its original shape and to an amplitude approaching what it was originally, as shown in FIG. 3E. It can be seen that the upper frequencies of FIG. 3D have been attenuated more than the lower frequencies. By strategically placing repeater stations including a frogging oscillator at various points along the cable length, attenuation is kept substantially constant for all frequencies in the band. However, if the signal from one of the remote stations is frogged more than the signal from the other, its frequency error correction will be different from the correction of the other signal.

Figure 4A:
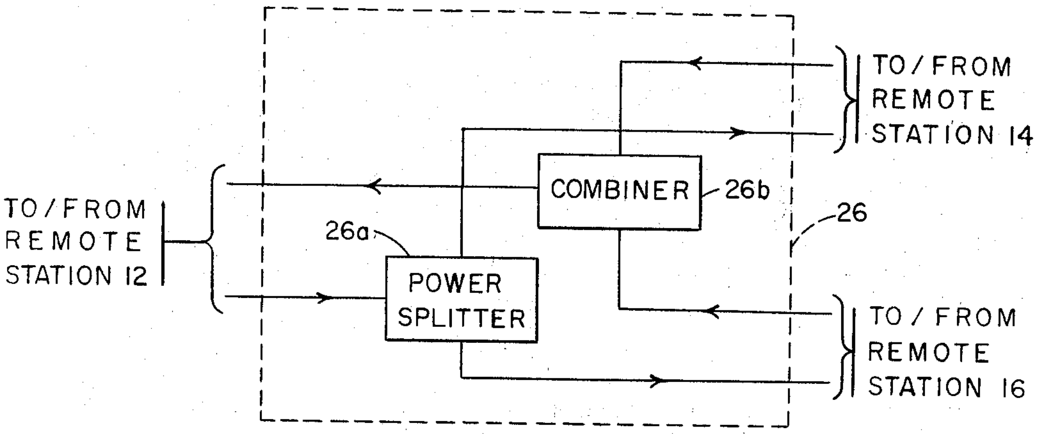
FIG. 4A is a schematic representation of the splitter and combiner portion of the system of FIG. 2.

Referring now to FIG. 4A, the technique by which the signal transmitted from the central station 12 of FIG. 2 to the remote station is split powerwise at the junction point is shown in more detail. The power splitter **26*a* may take any of a number of forms of power dividers known to the art. However, when signals are transmitted in the other direction, from the two remote stations through the junction and onto the single two-cable pair 17, the different frequency errors in the signals from the two remote stations mentioned above cause serious problems. A possible solution would be to use precise repeater oscillators, so as to remove the need for having the same number of repeater stations in the links between remote stations 14 and 16** and the junction. This solution is impractical, however, since the requisite precision of the repeater oscillators would be obtainable only with temperature-stabilized crystal oscillators, thus requiring an oven and power therefor, the latter not normally being available at the remotely located repeater stations, and at which environmental conditions are unpredictable.

Figure 4B:
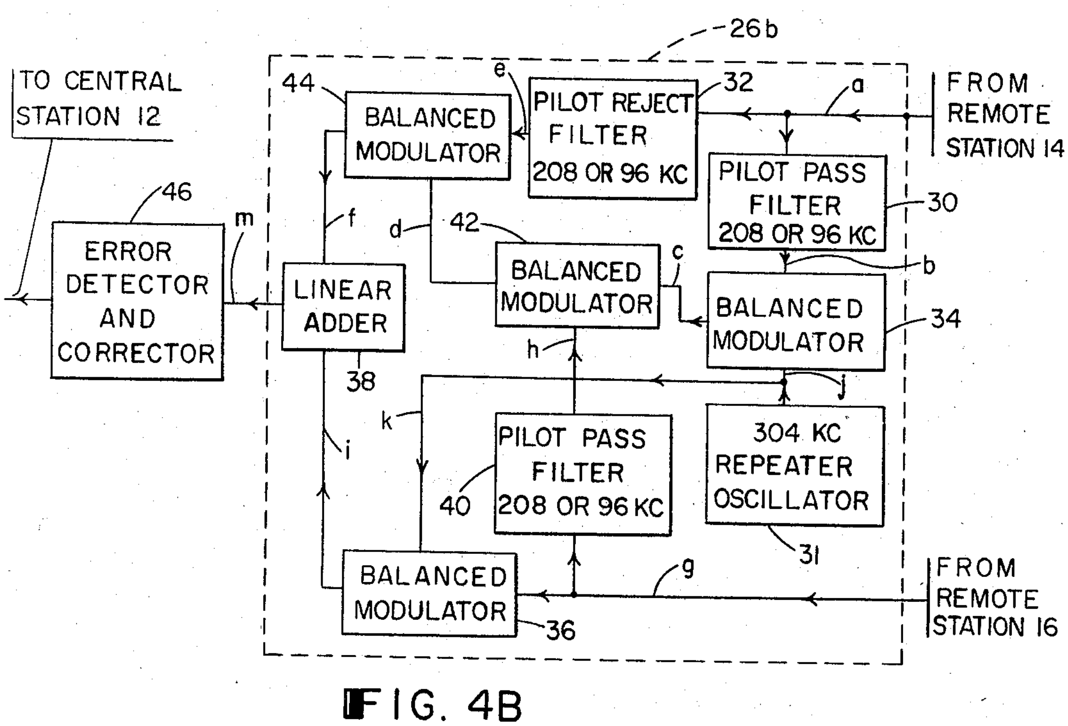
FIG. 4B is a block diagram of the combiner circuit of FIG. 4A.

In accordance with the present invention, the need for precision oscillators at the repeaters is eliminated by the use of the combiner circuit shown in FIG. 4B. The combiner is shown as including a frogging oscillator 31 for generating a signal with a frequency of approximately 304 kc. This frequency may differ according to the particular application and is suggested only for illustrative purposes. The signal from the first remote station 14, being generated within chosen frequency band limits and including a pilot signal, is applied both to a pilot pass filter 30 and a pilot reject filter 32, which are adapted for use with the particular pilot frequency chosen. The output of the filter 30 is applied to a balanced modulator 34, where it is added to the signal from the frogging oscillator 31. The signal from the second remote station 16 is applied to a second balanced modulator 36, to which is also applied the frogging signal from oscillator 31. Modulator 36 subtracts the signal applied by the second remote station 16 from the frequency of oscillator 31, and the resultant output signal is applied to a linear adder 38. The signal from the second remote station is also applied to a filter 40 designed to pass the pilot frequency, the output of the filter being applied to a third balanced modulator 42, where its frequency is subtracted from the frequency of the output signal from balanced modulator 34. The output of modulator 42 is applied to a fourth balanced modulator 44 in which the frequency output of pilot reject filter 32 is subtracted from it. The output of balanced modulator 44 is combined with the output of balanced modulator 36 in the linear adder 38, which continuously adds instantaneous output amplitudes. The signal from linear adder 38, which is within a single signal band and which has a single piot, is transmitted to the central station through an error detector and corrector 46 at the receiver, which detects the pilot error and corrects the signal band accordingly by a feedback loop.

An example of a balanced modulator useful in the present invention is described in Electronic and Radio Engineering, 4th ed. (1955), McGraw-Hill Book Co., pp. 540–541, by Frederick E. Terman. Also useful in the present invention, an error detector and corrector and a linear adder are found in the following references, respectively: Lenkurt-System Description, Type 45BN–1 Carrier Equipment, Form 45BN–1–DES, SO–15000, Issue #3, February 1959, pp. 16–18; Reference Data For Radio Engineers, 4th ed. (1956), International Telephone and Telegraph Corp., p. 458.

The operation of the combiner system of FIG. 4B will best be understood by consideration of a specific example. The signal band limit stated in the example might appear to be reversed with the upper signal band frequency appearing first in some cases. However, it should be understood that this choice is merely for convenience in illustrating the signal band limits at the output line *m* to be in the correct order. Also, it is possible that at the output to the combiner the signal band limits will be reversed if an odd number of repeater stations are provided between the transmission point and the combiner.

Assuming the first remote station signal and second remote station signal to be intended for a 140 kc.–40 kc. signal band with 96 kc. pilot, with each using frequency channels within that band width, the actual signal band limits and pilot at point *a* in FIG. 4B (after travel along a finite cable length) might be 140,020—40,020 cycles with a 96,020 cycle pilot; and the second remote station signal at point *g* might have a signal band of 139,995—39,995 cycles with a 95,995 cycle pilot. To combine these signals would result in distortion unsatisfactory for a digital communication system, since a single error detector would recognize two errors without discrimination as to which one was to be corrected. Also, in the following example, a precision frogging oscillator 31 is not used, primarily for the reasons discussed above in connection with the repeater stations and can therefore be expected to generate a signal having some deviation from its nominal frequency of 304 kc. For purposes of the present example, it will be assumed that the frogging oscillator signal is 304,010 cycles. In the present system, the following outputs would result at various points throughout the system of FIG. 4B.

| Signal Band: | Pilot |
|---|---|
| (a) 140,020—40,020 | 96,020 |
| (b) None | 96,020 |
| (e) 140,020—40,020 | None |
| (d) None | 304,035 |
| (e) 140,020—40,020 | None |
| (f) 164,015—264,015 | None |
| (g) 139,995—39,995 | 95,995 |
| (h) None | 95,995 |
| (i) 164,015—264,015 | 208,015 |
| (j) None | 304,010 |
| (k) None | 304,010 |
| (m) 164,015—264,015 | 208,015 |

Signals *f* and *i* represent the corrected frequency bands with signal *i* having a pilot frequency and *f* not. The single pilot frequency accompanying signal *i* is used in the error detector and corrector 46 to correct the entire frequency band. In FIG. 4B the pilot pass and reject filters 30, 40 and 32 are shown as being operative on 96 kc. or 208 kc. pilots, since the system is versatile enough to correct 96 kc. input pilot signals to 208 kc. at the output of the combiner (as shown in the example) or to correct a 208 kc. input to a 96 kc. output. Also, it may be seen that the non-precision of repeater oscillator 31 is of no consequence since its output is applied to both inputs. To summarize, the function of the combiner circuit of FIG. 4B is to cancel the error of one input and in its place apply the error of the other signal, thereby providing a single frequency error for correction before input to the receiver.

Although preferred and illustrative embodiments have been shown and described, changes will occur to those skilled in the art. It is the intention, therefore, that the invention not be limited by the features shown and described, except as such limitations appear in the following claims.

What is claimed is:

1. In a comunications system including first and second geographically separated transmitters located remotely from a common receiver, each operative to generate information signals within a signal band, and a pilot signal and wherein the pilot signal frequency and signal band frequencies are subject to error, a circuit for combining the signals from said first and second transmitters for transmission over a common cable link to said receiver, said combining circuit comprising: a frogging oscillator for generating a signal of predetermined frequency; means for subtracting said signal band limit frequencies and the pilot frenquency generated by said first transmitter from said predetermined frequency; means for adding the pilot frequency generated by said second transmitter to said predetermined frequency; means for subtracting the pilot frequency generated by said first transmitter from the result of the addition; means for subtracting the signal band frequency limits generated by said second transmitter from the output of said third-mentioned means; and means for adding the result of the last-mentioned means to the output of said first-mentioned means to produce output signal band and pilot frequencies for error detection and correction.

2. In a communications system including first and second geographically separated transmitters located remotely from a common receiver, each operative to generate information signals within a signal band and a pilot signal, and wherein the pilot signal frequency and band frequencies are subject to error, a circuit for combining the signals from said first and second transmitters for transmission over a common cable link to said receiver, and a combining circuit comprising: a frogging oscillator for generating a signal of predetermined frequency; a first balanced modulator operative to subtract said signal band frequencies and the pilot frequency generated by said first transmitter from said predetermined frequency; a second balanced modulator operative to add the pilot frequency generated by said second transmitter to said predetermined frequency; a third balanced modulator operative to subtract the pilot frequency generated by said first transmitter from the result of the addition; a fourth balanced modulator operative to subtract the signal band frequencies generated by said second transmitter from the output of said third balanced modulator; and a linear adder for adding the output of said fourth balanced modulator to the output of said first balanced modulator to produce output signal and pilot frequencies for error detection and correction.

3. For a comunications system having first and second geographically separated transmitter-receivers remote from a central transmitter-receiver, said first and second transmitter-receivers each generating signals subject to frequency error, comprising: a first signal path between said first transmitter-receiver and a junction; a second signal path between said second transmitter-receiver and said junction; a third signal path between said junction and said central transmitter-receiver; and combiner circuit means at said junction operative to apply the frequency error of the signal from said first transmitter-receiver to the signals arriving at said junction over said second signal path and to cancel said frequency error of the signal from said second transmitter-receiver, said combiner circuit means including; first, second, third and fourth branches, said first branch including a first balanced modulator and a line adder, said second branch including a first pilot pass filter and a second balanced modulator, said third branch including a pilot reject filter, a third balanced modulator and said linear adder, said fourth branch including a second pilot pass filter, a fourth balanced modulator, said second balanced modulator and said third balanced modulator; and a frogging oscillator for providing an input to said fourth balanced modulator and to said first balanced modulator.

4. A cable communications system having first and second remote transmitters each adapted to transmit a plurality of signal frequencies within a signal band to a single receiver comprising: a first cable link including repeater stations between said first transmitter and a junction in which frequency errors are introduced in transmission of signals from said first transmitter to said junction, a second cable link including repeater stations between said second transmitter and said junction in which other frequency errors are introduced in transmission of signals from said second transmitter to said junction, a third cable link between said junction and said single receiver, said first and second cable links being of unequal length and the longer including therein more repeater stations than the shorter, and at said junction, combiner means operative in response to said frequency error of the signals from said first transmitter as a reference to apply it to the signals from said second transmitter and to cancel said frequency errors of the signals from said second transmitter.

5. A cable communications system having first and second remote transmitters each adapted to transmit a plurality of signal frequencies including a pilot frequency within a signal band to a single receiver comprising: a first cable link including repeater stations between said first transmitter and a junction in which frequency errors are introduced in transmission of signals from said first transmitter to said junction, a second cable link including repeater stations between said second transmitter and said junction in which other frequency errors are introduced in transmission of signals from said second transmitter to said junction, said first and second cable links being of unequal length, and a third cable link between said junction and said single receiver, said receiver including an error detector and corrector operative in response to said output pilot frequency to correct the error of said output signal band frequencies.

References Cited

UNITED STATES PATENTS

| | | | |
|---|---|---|---|
| 2,861,128 | 11/1958 | Metzger | 179—15 |
| 3,099,716 | 7/1963 | Jacquier | 179—15 |
| 3,118,111 | 1/1964 | Miller | 179—15 |
| 3,270,137 | 8/1966 | Halsey | 179—15 |

DAVID G. REDINBAUGH, *Primary Examiner.*

ROBERT L. GRIFFIN, *Examiner.*